United States Patent
Lubischer

(10) Patent No.: US 7,139,650 B2
(45) Date of Patent: Nov. 21, 2006

(54) MANEUVERABILITY ASSIST SYSTEM

(75) Inventor: Frank Lubischer, Boppard (DE)

(73) Assignee: Lucas Automotive GmbH (DE)

( * ) Notice: Subject to any disclaimer, the term of this patent is extended or adjusted under 35 U.S.C. 154(b) by 251 days.

(21) Appl. No.: 10/817,509

(22) Filed: Apr. 2, 2004

(65) Prior Publication Data

US 2004/0199319 A1 Oct. 7, 2004

(30) Foreign Application Priority Data

Apr. 4, 2003 (DE) ................. 103 15 662

(51) Int. Cl.
- *B60W 10/02* (2006.01)
- *B60W 10/06* (2006.01)
- *B60W 10/18* (2006.01)

(52) U.S. Cl. ............................. 701/48; 701/70

(58) Field of Classification Search ............ 701/48
See application file for complete search history.

(56) References Cited

U.S. PATENT DOCUMENTS

| | | | |
|---|---|---|---|
| 4,583,611 A | 4/1986 | Frank et al. | |
| 5,281,006 A | 1/1994 | Götz et al. | |
| 5,408,411 A | 4/1995 | Nakamura et al. | |
| 5,558,178 A | 9/1996 | Hess et al. | |
| 6,154,688 A * | 11/2000 | Dominke et al. | 701/1 |
| 6,264,289 B1 | 7/2001 | Franke et al. | |
| 6,434,459 B1* | 8/2002 | Wong et al. | 701/36 |
| 6,446,710 B1 | 9/2002 | Beeck et al. | |
| 6,446,998 B1 | 9/2002 | Koenig et al. | |
| 6,450,019 B1 | 9/2002 | Wetzel et al. | |
| 6,856,877 B1* | 2/2005 | Coelingh et al. | 701/48 |
| 6,862,508 B1* | 3/2005 | Akiyama et al. | 701/48 |

2002/0005274 A1 1/2002 Beeck et al.

FOREIGN PATENT DOCUMENTS

| | | |
|---|---|---|
| DE | 33 31 297 | 3/1985 |
| DE | 38 31 449 | 3/1990 |
| DE | 40 35 805 | 3/1992 |
| DE | 42 01 146 | 7/1992 |
| DE | 41 33 912 | 4/1993 |
| DE | 42 39 711 | 6/1994 |
| DE | 197 55 431 | 6/1999 |
| DE | 198 38 972 | 3/2000 |
| DE | 198 59 953 | 6/2000 |
| DE | 199 01 953 | 7/2000 |
| DE | 199 63 374 | 7/2001 |
| JP | 10-129434 | * 5/1998 |

OTHER PUBLICATIONS

Document Bibliography and Abstract for DE 33 31 297 from the http://v3.espacenet.com/textdoc?DB=EPODOC &IDX=DE3331297 printed May 10, 2004.
Document Bibliography and Abstract for DE 40 35 805 from the http://v3.espacenet.com/textdoc?DB=EPODOC &IDX=DE4035805 printed May 10, 2004.

(Continued)

*Primary Examiner*—Michael J. Zanelli
(74) *Attorney, Agent, or Firm*—MacMillan, Sobanski & Todd, LLC

(57) ABSTRACT

The invention concerns a process for the operation of a vehicle unit comprising a motor vehicle to which a trailer is coupled, wherein the motor vehicle is equipped with electronic systems for controlling and/or regulating the operating conditions of the vehicle unit. To improve the maneuverability of such a vehicle unit, it is proposed that the operating conditions attained by the vehicle unit and/or desired by the driver are automatically controlled and/or regulated through the cooperation of the electronic braking system (EBS) and/or the electronic engine output control system and/or the electronic drive-train control (ASS) and/or the electronic steering system (ELS).

28 Claims, 1 Drawing Sheet

OTHER PUBLICATIONS

Document Bibliography and Abstract for DE 42 01 146 from the http://v3.espacenet.com/textdoc?DB=EPODOC &IDX=DE4201146 printed May 10, 2004.
Document Bibliography and Abstract for DE 42 39 711 from the http://v3.espacenet.com/textdoc?DB=EPODOC &IDX=DE4239711 printed May 10, 2004.
Document Bibliography and Abstract for DE 197 55 431 from the http://v3.espacenet.com/textdoc?DB=EPODOC &IDX=DE19755431 printed May 10, 2004.
Document Bibliography and Abstract for DE 198 59 953 from the http://v3.espacenet.com/textdoc?DB=EPODOC &IDX=DE19859953 printed May 10, 2004.
Document Bibliography and Abstract for DE 199 01 953 from the http://v3.espacenet.com/textdoc?DB=EPODOC &IDX=DE19901953 printed May 10, 2004.
Document Bibliography and Abstract for DE 199 63 374 from the http://v3.espacenet.com/textdoc?DB=EPODOC &IDX=DE19963374 printed May 10, 2004.

* cited by examiner

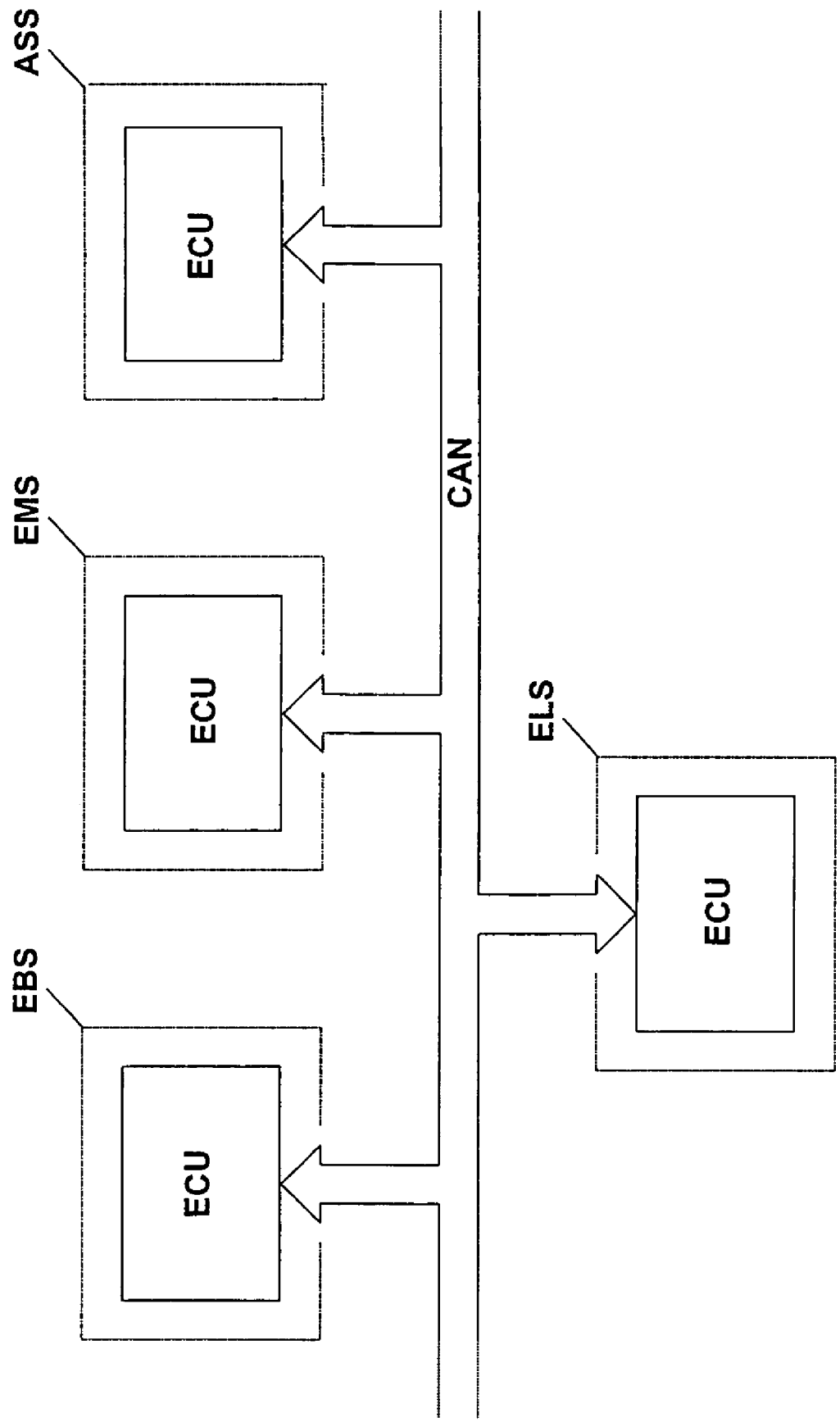

MANEUVERABILITY ASSIST SYSTEM

CROSS REFERENCE TO RELATED APPLICATION

This application claimed priority to German Patent Application No. 10315662.3 filed Apr. 4, 2003, the disclosures of which are incorporated herein by reference.

BACKGROUND OF THE INVENTION

The invention relates to a process for the operation of a vehicle unit that consists of a motor vehicle to which a trailer is coupled, wherein the motor vehicle is equipped with electronic systems for the control and/or regulation of operating conditions of the vehicle unit.

Modern motor vehicles are today equipped with a plurality electronic systems. These systems include, among others, an electronic braking system (EBS) within the functional scope of which may belong, for example, an anti-lock braking system (ABS), a drive-slip regulating system (ASR), a drive-dynamic regulating system (FDR), as well as an electronic park-brake system (EPB); an electronic engine output control system (EMS); an electronic drive-train control system (ASS); or an electronic steering system (ELS). Such electronic systems encompass, in known manner, an electronic control unit that detects parameter values relating to the operating conditions of the motor vehicle by electronic sensor devices. In this way, for example, in the case of ABS—the slip of the motor vehicles wheels, in the case of EMS—the rotational speed (rpm) of the vehicle engine, or in the case of ELS—the impact of the steering mechanism is thereby detected. On the basis of the detected parameters, the electronic control unit controls and/or regulates operating conditions of the motor vehicle via corresponding electrical control equipment in order, for example, in the case of ABS—to prevent the locking of the vehicle wheels, in the case of EMS—to modulate the power output of the motor vehicle engine, or in the case of ELS—to adjust the impact of the steering mechanism. So that the individual electronic systems are able to exchange data with each other, the electronic control units are linked with each other via an electronic communication system, such as CAN-Bus.

With modern motor vehicles, in particular so-called SUV's (abbreviation for Sport Utility Vehicles), it is today increasingly the trend that these are employed as towing vehicles for trailers. The so-provided vehicle unit lends itself in various ways to tasks in both practical-fields as well as leisure-fields, as the case may be, whether that relates to, for example, a transport trailer for goods, boats, motorcycles or the like, or for example, to a trailer-home.

Disadvantageous with such a vehicle unit is its reduced maneuverability, which arises as result of the trailer coupled to the motor vehicle.

SUMMARY OF THE INVENTION

The present invention relates to a process for control of a motor vehicle and trailer unit with the electronic systems of the motor vehicle.

The present invention contemplates a process for the operation of a vehicle unit that consists of a motor vehicle to which a trailer is coupled with the motor vehicle being equipped with a plurality of electronic systems for controlling and/or regulating operating conditions of the vehicle unit. The electronic systems include an electronic braking system (EBS), an electronic engine output control system (EMS), an electronic drive-train control system (ASS) and an electronic steering control system (ELS) with the operating conditions achieved by the vehicle unit and/or desired by the driver being automatically controlled and/or regulated through the co-operation of the electronic braking system (EBS), and/or the electronic engine output control system (EMS), and/or the electronic drive-train control system (ASS) and/or the electronic steering system (ELS).

The invention also contemplates the electronic systems described immediately that are connected by an electronic communication system and that the processes are integrated into the electronic systems by hardware and/or software.

Therefore, the object underlying the invention is to improve the maneuverability of such a vehicle unit.

Various objects and advantages of this invention will become apparent to those skilled in the art from the following detailed description of the preferred embodiment, when read in light of the accompanying drawings.

BRIEF DESCRIPTION OF THE DRAWING

The sole FIGURE is a block diagram illustrating the maneuverability assist system.

DETAILED DESCRIPTION OF THE INVENTION

As a solution of the problem, the invention proposes for the operation of a vehicle unit as mentioned at the outset, to proceed such that, through the cooperation of the electronic braking system and/or the electronic engine output control system and/or the electronic drive-train control system and/or the electronic steering system, operating conditions attained by the vehicle unit and/or desired for the vehicle unit by the driver are automatically controlled and/or regulated.

The great advantage of the invention resides in the fact that currently available electronic systems are employed in order to automatically control or to regulate, respectively, operating conditions attained by the vehicle unit or desired by the driver for the vehicle unit during maneuvering. Because this is achieved through appropriate cooperation of the electronic systems, it furthermore provides the advantage that the desired functionality with the individual operating conditions is, as a general rule, able to be incorporated into the electronic control units of the electronic systems as software (on a software basis), which is comparatively inexpensive since, as a rule, no intrusions into the hardware of the electronic systems are required.

Particularly advantageous approaches for particularly relevant operating conditions of the vehicle unit will be elaborated upon in the following.

It can be so provided that, when the vehicle unit attains the operating condition "stop on an incline or a decline", the electronic brake system automatically holds the vehicle unit stationary to prevent the vehicle unit from rolling away. In the event the electronic braking system includes an electronic park-brake system, this can be deployed supplementarily or independently for maintaining the vehicle unit stationary.

Alternatively—in particular when the vehicle unit achieves the operating condition "stop on an incline"—there can be provided that the electronic engine output control system and/or the electronic drive-train control system automatically holds the vehicle unit stationary to prevent rollback of the vehicle unit.

If the operating condition "restart" is desired for the vehicle unit, it can be provided that the electronic braking system and/or the electronic drive-train control system cooperates with the electronic engine output control system in such a manner that a smooth (jolt-free) movement of the vehicle unit takes place in the direction of travel desired by the driver. Through the cooperation of the electronic braking system and/or the electronic drive-train control system, a start request is able to be particularly well gradually implemented, so that, for example, start-up procedures with a ramp-shaped increasing or decreasing speed profile or acceleration profile are able to be realized.

In the event that the operating condition "constant travel" is desired, it can be provided that the electronic braking system and/or the electronic drive-train control system cooperates with the electronic engine output control system in such a manner that a vehicle speed desired by the driver is held constant. Also here, the desired motor vehicle speed is able to be relatively precisely set or adjusted through the cooperation of the electronic braking system and/or the electronic drive-train control system with the electronic engine output control system, whereby in particularly advantageous manner also travel speeds in a lower speed range, for example less than 20 km/h, are able to be graduated.

So that, in the event that the operating condition "slow travel" is desired for the vehicle unit, a particularly sensitive calibration for adjustment of a desired motor vehicle speed by the driver is possible, it can be provided that the response behavior of the electronic engine output control system is altered in such manner that while maintaining the entire range of movement of the accelerator pedal, the amplification is reduced. A substantially broader range of movement of the accelerator pedal for a lower speed range is therefore made available to the driver.

It can also be provided that the reduction of the amplification occurs step-wise (i.e. in discrete steps) or continuously, for example according to a predetermined distribution function.

In a preferred manner, the reduction of the amplification is adjustable by the driver, for example by means of a switch device or a potentiometer easily operable by the driver.

In order to directly permit a normal acceleration of the motor vehicle or of the vehicle unit, respectively, at the wish of the driver, for safety reasons among others, it may be provided that when the actuation speed and/or the actuation force of the accelerator pedal exceeds a predetermined level, the reduction of the amplification is cancelled or overridden.

It can also be provided that, when a predetermined period of time has elapsed since the reduction of the amplification, the reduction of the amplification is cancelled or overridden.

In order to prevent critical driving conditions that arise under the influence of the friction coefficient of the driving surface, that is, when the vehicle unit attains the operating condition "spinning of at least one drive wheel", it may be provided that the electronic braking system and/or the electronic drive-train control system and/or the electronic engine output control system counteract the spinning of the drive wheel(s) concerned. A critical driving condition can arise, for example, during a mountain descent, when an (additional) braking effect for the vehicle unit is applied by means of the engine drag torque. Because the spinning of the drive wheel, caused for example by different friction coefficients of the driving surface on either side of the vehicle unit, leads to a loss of cornering force, so the danger arises that the vehicle unit may jack-knife across the travel direction, to which during mountain descent the load exerted by the trailer on the motor vehicle has an encouraging effect.

In order to achieve a braking effect for the reduction or adjustment of the motor vehicle speed as early as possible, and not merely upon an actuation of the brake pedal by the driver, it can be provided that when the operating condition "reduce speed" is desired for the vehicle unit, the retraction of the accelerator pedal of the electronic engine output control system is evaluated in order to, in the event of exceeding or falling below a predetermined level or threshold, generate a moment (torque) counteracting the drive or propulsion of the vehicle unit via the electronic braking system and/or the electronic drive-train control system. A braking procedure is thereby already commences upon retraction of the accelerator pedal, which leads to a substantial reduction of the reaction time in transferring from the accelerator pedal to the brake pedal.

In preferred manner, the level or threshold is therefore predetermined as a particular gradient during retraction of the accelerator pedal, for example a particular retraction speed, and/or as a particular position of the accelerator pedal, for example a particular position before the home position.

Advantageously, the level or threshold is adjustable step-wise, i.e. discretely, and/or continuously by the driver, for example according to a predetermined distribution function. This can for example occur by means of a switch device or a potentiometer easily operable by the driver.

Very importantly, the reduction of the turning circle contributes to an improvement in the maneuverability of the vehicle unit. Hence, when the operating condition "cornering" is desired for the vehicle unit, it can provided that the impact of the steering is evaluated in order to, in the event of exceeding or falling below a predetermined level, generate a moment (torque) counteracting the drive or propulsion of the vehicle unit on at least one wheel of the motor vehicle at an inner side of the curve via the electronic braking system and/or the electronic drive-train control system. Accordingly, a targeted braking of at least one wheel of the motor vehicle at an inner side of the curve takes place.

Optionally or additionally, for a reduction of the turning circle it may be provided that, when the operating condition "cornering" is desired for the vehicle unit, the impact of the steering is evaluated in order to, in the event of exceeding or falling below a predetermined level, produce a moment or torque on at least one wheel of the motor vehicle at an outer side of the curve aiding (supporting) the propulsion of the vehicle unit via the electronic braking system and/or the electronic drive-train control system. This lends itself in particular to situations where the drive train-control system permits an active engagement in the differential, so that a greater drive torque can be targeted to at least one wheel at an outer side of the curve, compared to the opposite inner wheel.

A further possibility for the reduction of the turning circle separately or in addition to the mentioned possibilities results in that, when the operating condition "cornering" is desired for the vehicle unit, the impact of the steering is evaluated in order to, in the event of exceeding of falling below of predetermined level, generate a moment (torque) at the real wheels of the motor vehicle supporting the cornering travel of the vehicle unit via the electronic steering system. Accordingly, an additional steering moment is thereby established at the real wheels of the motor vehicle, which naturally presumes that the motor vehicle is equipped with a corresponding device for steering the real wheels.

The authoritative level or threshold for a reduction of the turning circle during cornering is predetermined as a particular steering angle and/or as a particular vehicle speed. Especially with dependence of the level upon a particular motor vehicle speed, it can be ensured that the reduction of the turning circle can only be activated within a lower speed range, for example lower than 20 km/h, so that a safety risk is precluded in the normal driving mode.

Also here, the level is advantageously step-wise (i.e. discretely) and/or continuously adjustable by the driver, for example according to a predetermined distribution function, which for example may occur by means of a switch device or potentiometer readily operable by the driver.

In the event the electronic braking system is also able to operate upon the wheels of the trailer, or the trailer itself comprises an electronic braking system, during turning maneuvers of the vehicle unit it can be provided that when the operating condition "forward travel" is desired for the vehicle unit, a moment (torque) counteracting the propulsion of the vehicle unit is produced on at least one wheel of the trailer at inner side of the curve via the electronic braking system. At least one wheel of the trailer at an inner side of the curve is thereby braked, and forms a pivot point for the trailer so that the vehicle unit manages with a substantially lower space requirement during "straightening" of the trailer with reference to the motor vehicle.

In order also to bring about a space-saving "straight pushing" of the trailer in relation to the motor vehicle, it may be provided that when the operating condition "reverse travel" is desired for the vehicle unit, a moment (torque) counteracting the propulsion of the vehicle unit is produced on at least one wheel of the trailer at an outer side of the curve via the electronic braking system. Thereby, at least one wheel of the trailer at an outer side of the curve is braked, and then forms a pivot point when "straight pushing".

In cramped situations, a deliberate "jack-knifing" of the trailer in relation to the travel direction of the motor vehicle is often desired. In order to also be able to bring this about in a space-saving manner, it can be provided that, when the operating condition "reverse travel" is desired for the vehicle unit, a moment (torque) counteracting the propulsion of the vehicle unit is produced on at least one wheel of the trailer at an inner side of the curve via the electronic braking system. Accordingly, the at least one braked wheel of the trailer at an inner side of the curve forms a pivot point for "jack-knifing".

To ease the maneuvering of the vehicle unit for the driver, it can be provided that the power assistance supplemented by the electronic steering system for assisting driver is adjustable. In this way, for example with the previously mentioned operating condition attained by the vehicle unit and/or desired for the vehicle unit by the driver, the power assistance supplemented by the electronic steering system can be raised in order relieve the driver to a large extent so that he can direct is concentration to actual maneuvering.

It may similarly be provided that the transmission of the electronic steering system is adjustable, whereby a particularly sensitive, metered steering sensation is provided to the driver, which is indispensable for precise maneuvering.

It will be understood by a person skilled in the art that the afore-mentioned procedures for especially relevant operating conditions of the vehicle unit are combinable in any desired manner with one another, whereby different increments (embodiments) of the process according to the invention are able to realized, so that a conformation to the otherwise existing electronic systems in the motor vehicle or the vehicle unit is able to take place in a flexible manner.

To the extent that is not expressly specified, it is also understood by a person skilled in the art that the afore-mentioned procedures according to the invention are likewise applicable for "forward travel" and "reverse travel" of the vehicle unit or the motor vehicle.

Furthermore, it is understood by a person skilled in the art that the afore-mentioned procedures according to the invention are applicable independent of the type of drive of the motor vehicle. Accordingly, it makes no difference whether the motor vehicle is equipped with front-, rear- or all-wheel-drive.

In connection with the electronic braking system, it is known to the person skilled in the art that the process according to the invention involves a braking system that allows the execution of automatic brake applications—i.e. independent of the driver. As a result, besides a conventional braking system with an ABS/ASR/FDR-unit as intermediary to the brake pressure transmitter and the wheel brakes, so-called "Brake-by-Wire"-Systems of the EHB-Type (abbreviation of Electro-Hydraulic Braking) or the EMB-Type (abbreviation of Electro-Mechanical Braking) come into particular consideration.

If the afore-mentioned procedures according to the invention are primarily provided in connection with a vehicle unit, the skilled person likewise recognizes that the advantages provided thereby are also applicable to a motor vehicle as such, that is, to a motor vehicle to which no trailer is coupled. In this way the maneuverability of a motor vehicle 'per se' improves when, according to the inventive process, an improved graduation of the vehicle speed in a lower speed range and/or a consideration of the influence of the friction coefficient of the driving surface and/or a reduction of the turning circle and/or an optimization of the reaction time during transfer from the accelerator pedal to the brake pedal is provided for.

Thus, the invention also relates to an electronic system for a motor vehicle, for which the process according to the invention is integrated on a hardware basis and/or implemented on a software basis into the electronic system or into its electronic control unit.

Because automatic brake actions (applications) are able to be carried out in a multitude of ways by means of the process according to the invention, it is particularly advantageous if the electronic system into which the inventive process is integrated or implemented on a hardware basis and/or on a software basis is the electronic braking system or its respective electronic control unit.

Alternatively, the electronic system may also be the electronic steering system, or its respective electronic control unit.

Hereafter, the cooperation of electronic systems in a motor vehicle or a vehicle unit is illustrated exemplarily with a block diagram, which is displayed in the single drawing.

With the electronic system, it is concerned with an electronic braking system EBS, an electronic engine output control system EMS, a drive-train control system ASS as well as an electronic steering system ELS. Each of these systems comprises an electronic control unit ESU. The individual electronic control units are linked with one another via a Bus- or communication-system identified as CAN (abbreviation of Controller Area Network), in order to be able to exchange data between one another. By means of the data exchange, the individual systems are able to cooperate to carry out the process according to the invention.

Although embodiments of the present invention have been illustrated in the accompanying drawing and described in the forgoing detailed description, it will be understood that the invention is not limited to the embodiment disclosed, but is capable of numerous rearrangements, modifications and substitutions without departing from the spirit of the invention as set forth and defined by the following claims.

The invention claimed is:

1. Process for the operation of a vehicle unit, which consists of a motor vehicle to which a trailer is coupled, the process comprising:
   (a) providing a motor vehicle that is equipped with a plurality of electronic systems for controlling operating conditions of the vehicle unit, the electronic systems including an electronic braking system (EBS), an electronic engine output control system (EMS), an electronic drive-train control system (ASS) and an electronic steering control system (ELS); and
   (b) automatically controlling the operating conditions achieved by the vehicle unit through the cooperation of at least two of the systems in the group of the electronic braking system (EBS), the electronic engine output control system (EMS), the electronic drive-train control system (ASS) and the electronic steering system (ELS), such that when the vehicle unit achieves an operating condition "stop on an incline or a decline", at least one of the electronic engine output control system (EMS), the electronic drive-train control system (ASS) and the electronic braking system (EBS) holds the vehicle unit stationary.

2. Process according to claim 1, wherein when an operating condition "restart" is desired for the vehicle unit, at least one of the electronic braking system (EBS) and the electronic drive-train control system (ASS) cooperates with the electronic engine output control system (EMS) in such a way that a smooth (jolt-free) movement of the vehicle unit occurs in the direction of travel desired by the driver.

3. Process according to claim 1, wherein when an operating condition "constant travel" is desired for the vehicle unit, at least one of the electronic braking system (EBS) and the electronic drive-train control system (ASS) co-operates with the electronic engine output control system (EMS) in such a way that a vehicle speed desired by the driver is maintained.

4. Process according to claim 1, wherein when an operating condition "slow travel" is desired for the vehicle unit, the response behaviour of the engine output control system (EMS) is altered in such a way that, while maintaining the entire range of movement of the accelerator pedal an amplification is reduced.

5. Process according to claim 4, wherein the reduction of the amplification occurs step-wise.

6. Process according to claim 4, wherein the reduction of the amplification is adjustable by the driver.

7. Process according to claim 4, wherein when at least one of an actuation speed and an actuation force of the accelerator pedal exceeds a predetermined level, the reduction of the amplification is cancelled.

8. Process according to claim 4, wherein when a predetermined period of time has elapsed since reduction of the amplification, the reduction of the amplification is cancelled.

9. Process according to claim 4, wherein the reduction of the amplification occurs continuously.

10. Process according to claim 1, wherein when the vehicle unit attains the operating condition "spinning of at least one drive wheel", the electronic braking system (EBS) and at least one of the electronic drive-train control system (ASS) and the electronic engine output control system (EMS) counteracts the spinning of the drive wheel(s) concerned.

11. Process according to claim 1, wherein when the operating condition "reduce speed" is desired for the vehicle unit, the retraction of the accelerator pedal of the electronic engine output control system (EMS) is evaluated in order to, in the event of exceeding or falling below a predetermined level, produce a moment (torque) counteracting the propulsion of the vehicle unit via the electronic braking system (EBS) and the electronic drive-train control system (ASS).

12. Process according to claim 11, wherein the level is predetermined as a particular gradient during retraction of the accelerator pedal.

13. Process according to claim 11, wherein the level is adjustable step-wise.

14. Process according to claim 11, wherein the level is predetermined as a particular position of the accelerator pedal.

15. Process according to claim 11, wherein the level is adjustable continuously by the driver.

16. Process according to claim 1, wherein when the operating condition "cornering" is desired for the vehicle unit, the impact of the electronic steering system (ELS) is evaluated in order to, in the event of exceeding or falling below a predetermined level, produce a moment (torque) on at least one wheel of the motor vehicle at an inner side of the curve counteracting the propulsion of the vehicle unit via at least one of the electronic braking system (EBS) and the electronic drive-train control system (ASS).

17. Process according to claim 16, wherein the predetermined level is at least one of a particular steering angle and a particular vehicle speed.

18. Process according to claim 16, wherein the level is adjustable step-wise.

19. Process according to claim 16, wherein when the operating condition "forward travel" is desired for the vehicle unit, a moment (torque) counteracting the propulsion of the vehicle unit is produced on at least one wheel of the trailer at an inner side of the curve via the electronic braking system (EBS).

20. Process according to claim 19, wherein when the operating condition "reverse travel" is desired for the vehicle unit, a moment (torque) counteracting the propulsion of the vehicle unit is generated on at least one wheel of the trailer at an outer side of the curve via the electronic braking system (EBS).

21. Process according to claim 19, wherein when the operating condition "reverse travel" is desired for the vehicle unit, a moment (torque) counteracting the propulsion of the vehicle unit is generated on at least one wheel of the trailer at an inner side of the curve via the electronic braking system (EBS).

22. Process according to claim 16, wherein the level is adjustable continuously by the driver.

23. Process according to claim 1, wherein when the operating condition "cornering" is desired for the vehicle unit, the impact of the electronic steering system (ELS) is evaluated in order to, in the event of exceeding or falling below a predetermined level, produce a moment (torque) on at least one wheel of the motor vehicle at an outer side of the curve supporting the propulsion of the vehicle unit via at least one of the electronic braking system (EBS) and the electronic drive-train control system (ASS).

24. Process according to claim 1, wherein when the operating condition "cornering" is desired for the vehicle unit, the impact of the electronic steering system (ELS) is evaluated in order to, in the event of exceeding or falling below a predetermined level, generate a moment (torque) at the rear wheels of the motor vehicle supporting the cornering travel of the vehicle unit via the electronic steering system (ELS).

25. Process according to claim 1, wherein a power assistance supplemented by the electronic steering system (ELS) for assisting the driver is adjustable.

26. Process according to claim 1, wherein a transmission of the electronic steering system (ELS) is adjustable.

27. An electronic system for a vehicle unit, which consists of a motor vehicle to which a trailer is coupled, the system comprising:

an electronic braking system adapted to be installed upon the motor vehicle;

an electronic engine output control system adapted to be installed upon the motor vehicle;

an electronic drive-train control system adapted to be installed upon the motor vehicle;

and an electronic steering control system adapted to be installed upon the motor vehicle; and an electronic communication system linking the braking system, engine output control system, electronic drive-train control system and the electronic control system with at least two of the electronic control systems co-operating to automatically control the operating by the vehicle unit in accordance with a process that is integrated into the electronic systems as hardware, such that when the vehicle unit achieves an operating condition "stop on an incline or a decline", at least one of the electronic engine output control system (EMS), the electronic drive-train control system (ASS) and electronic braking system (EBS) holds the vehicle unit stationary.

28. An electronic system for a vehicle unit, which consists of a motor vehicle to which a trailer is coupled, the system comprising:

an electronic braking system adapted to be installed upon the motor vehicle;

an electronic engine output control system adapted to be installed upon the motor vehicle;

an electronic drive-train control system adapted to be installed upon the motor vehicle;

and an electronic steering control system adapted to be installed upon the motor vehicle; and an electronic communication system linking the braking system, engine output control system, electronic drive-train control system and the electronic control system with at least two of the electronic control systems co-operating to automatically control the operating by the vehicle unit in accordance with a process that is integrated into the electronic systems as software, such that when the vehicle unit achieves an operating condition "stop on an incline or a decline", at least one of the electronic engine output control system (EMS), the electronic drive-train control system (ASS) and the electronic braking system (EBS) holds the vehicle unit stationary.

* * * * *